United States Patent [19]

Mørch

[11] 4,257,615
[45] Mar. 24, 1981

[54] TONE ARM

[76] Inventor: Hans H. Mørch, Skovvej 16, 2820 Gentofte, Denmark

[21] Appl. No.: 41,436

[22] Filed: May 22, 1979

[30] Foreign Application Priority Data

May 26, 1978 [GB] United Kingdom .............. 23508/78

[51] Int. Cl.$^3$ .............................................. G11B 3/10
[52] U.S. Cl. ..................................... 369/244; 369/255
[58] Field of Search ..................................... 274/23 R

[56] References Cited

U.S. PATENT DOCUMENTS

| 3,167,317 | 1/1965 | Wilson | 274/23 R |
| 3,319,967 | 5/1967 | Zimmermann | 274/23 R |
| 3,366,382 | 1/1968 | Haddy | 274/23 R |
| 4,066,266 | 1/1978 | Anley | 274/23 R |
| 4,102,536 | 7/1978 | Clunis | 274/23 R |
| 4,143,248 | 3/1979 | Broeksema et al. | 274/23 R |

FOREIGN PATENT DOCUMENTS

| 7700039 | 7/1978 | Netherlands | 274/23 R |
| 977841 | 12/1964 | United Kingdom | 274/23 R |

Primary Examiner—John W. Shepperd

[57] ABSTRACT

This invention concerns a tone arm of the type in which a separate element is supporting the extending parts of the arm. This separate element is comprising the suspension point around which the arm is moving, and it differs from the type of those elements already known thereby, that said suspension point is placed excentrically with respect to the center of gravity of the said separate element, which is made of solid material in such a way, that the said element is giving almost no contribute to the total inertial moment of the tone arm as to the suspension point, even if it is comprising electrical joints and attachment of arm tube or -rod above the suspension point.

11 Claims, 6 Drawing Figures

TONE ARM

BACKGROUND OF THE INVENTION

Moveable arm devices for holding a cartridge (for instance a phono cartridge) that can detect mechanical-, or may be also optical-, magnetic- or other sorts of informations, the so called tone arms, are always comprising a compromise of different point of views related to the special purpose of the tone arm in question. For instance a tone arm made of heavy materials will probably have no or just very few and small resonances, whereas tone arms made of light materials will be much more likely to have resonances, which will drastically diminish the quality of sound.

One of the most important factors for tone arms constructed for use with modern phonograph cartridges is the inertial moment of the tone arm, which must be sufficiently low to prevent the combination of cartridge and arm from oscillating and to ensure that the stylus with cantilever and the whole cartridge will always be able to accurately follow the grooves of even warped records. Such a tone arm will have to be made of very light materials, which are usually causing many resonances.

The purpose of the invention is to obtain a tone arm having no or just few resonances and having a very low inertial moment as to the point around which the arm is moving and on which—if desired—it is also possible to change out a minor part of the tone arm—the arm tube or -rod—carrying the cartridge in order to make it easy to change to another cartridge. Another purpose is that the point around which the vertical movement of the arm takes place should be positioned close to the horizontal plane in which the surface of the record is positioned, and further it is a purpose of the invention to make an adequate skating force compensation.

SUMMARY OF THE INVENTION

According to the invention all this is obtained by the employment of a special separate element for supporting the extending parts of the tone arm. This separate element is made of solid material/s and it is comprising the suspension point, fulcrum, around which the arm is moving. The suspension point is placed excentrically with respect to the center of gravity of said separate element, which is having the major part of its mass on the side of the suspension point that faces away from the side to which the arm tube or -rod is extending. In said major part of mass is a cavity or cavities comprising the way for the electrical connection to the arm tube or -rod, and the separate element is further having such a shape, that it is at the same time allowing for the arm tube or -rod to be attached to it in such a way, that it can extend from above the suspension point and allowing for the detachment of the part of the separate element to which the arm tube or -rod is attached and allowing for an extremely rigid and stable mechanical contact to the detachable piece of element carrying the arm tube or -rod and allowing for arrangement of electrically connecting terminals in the said cavities between the separatable pieces of the element and allowing for a simple arrangement of antiskating force and allowing for the use of heavy materials for at least a part of said element and further the reduced symmetri of the said element/s (because of the excentricity) will counteract the possibility of resonances in the tone arm.

All these features are obtained by the employment of the said separate element, and almost all the mass of this element is the major part of the mass that is necessary to counterbalance the weight of phono cartridge and arm tube or -rod.

Also the electrical and mechanical connections to a detachable arm tube or -rod, which would otherwise have to be counterbalanced, is according to the invention acting as a part of the counterweight.

In case that a tube is used for carrying the cartridge, it can be pressed flat in the end, where the cartridge is to be fixed thereby reducing the mass of an alternative joint and reducing the possibility of resonances.

The testing of specimen models have demonstrated qualities exceeding those of tone arms already known.

DETAILED DESCRIPTION OF THE INVENTION

Figure 1:
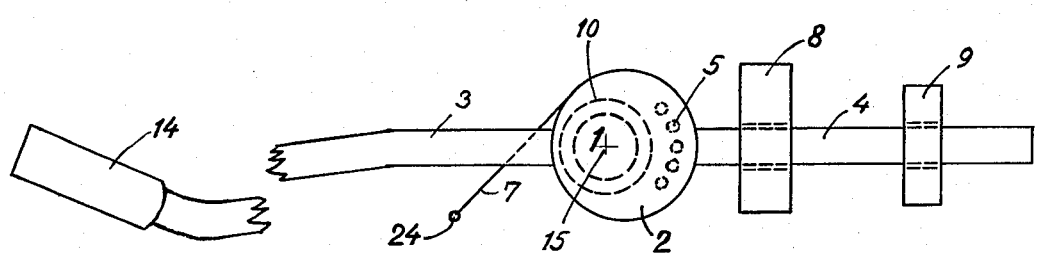
FIG. 1 shows the tone arm seen in a horizontal plane.
Figure 2:
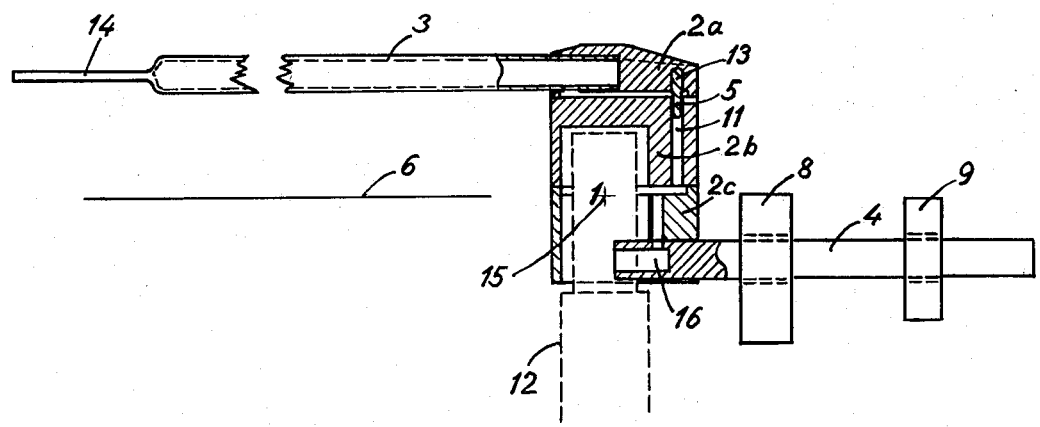
FIG. 2 is a vertical cross section of the tone arm.

According to the invention a separate element 2 is comprising the area of the suspension 1 which is excentrically positioned with respect to the center of gravity of said separate element 2, which is made of solid material and is having the major part of its mass close to and on the side of the suspension 1 that faces away from the side to which the arm tube or -rod 3 is extending to the cartridge. The word suspension is used to designate a bearing or bearings or other ways of carrying the moveable part of the tone arm, so that it can move as to the non moveable part of the tone arm 12. The suspension point 15 is positioned in the center of the area of the suspension 1 as seen in FIG. 1 and it is positioned about at level with the plane of the record 6 seen in FIG. 2. This suspension point 15 is the fulcrum of the tone arm and is attached to the element 2.

The element 2 can consist of one or more pieces, which can be made from identical or different kinds of material. For instance in FIG. 2 in the drawing the element 2 is divided in 3 pieces; 2a, 2b and 2c, which do not necessarily have to have identical horizontal cross sections as to the external surface. The external surface of the elements 2a, 2b or 2c could comprise shapes of cylinder, cone or parts thereof each having a—or parts of a polygonal-, oval-, elliptical- or circular cross section and the generatrix or parts of it being approximately at right angles to the plane of the record.

The suspension 1 could either in part or in full—as to the vertical extension of the element/s—be surrounded by the element/s 2 when seen in a horizontal plane, so that the suspension 1 is positioned in a cavity 10 in said element/s 2. This cavity thus is open below for accommodation of the non moveable part of the tone arm 12, but it could also in part be open in the direction where the arm tube or -rod 3 is extending.

By the employment of the described element/s 2 it is also possible to easily making a skating force compensation, which can vary in different ways, as the arm tube or -rod is moved towards the center of the record. For instance if the external surface of the elements 2 at least in one horizontal plane is having a circular cross section and is having a string 7 for skating force compensation attached to it on the surface of the element/s at this plane and in combination with said surface, which is eccentrically positioned as to the suspension, said string 7 is at the other end attached to the point of application 24 for the force of a pulling device which is pulling in such a direction in said plane that the string 7 is reeled around said surface over a range where the horizontal distance from the surface to the suspension point 15 is decreasing, as the arm tube or -rod 3 is moved towards the center of the record, the result would be a proportional decrease in skating compensation—provided that the pull in the string 7 is constant.

The counterweight rod or -tube 4 is preferably attached to the element/s 2 below the horizontal plane in which the suspension point /15 is positioned and extending away from the direction of the arm tube or -rod 3, but it could also be an integral part of the element 2c, which could then be devided from the rest of the element/s 2 by a preferably horizontal plane and extend just a small part of the extension of the conventional rod 3. The part of the element 2c that is thus extended is containing a cavity in which balancing weights of different size can be accomodated.

In the separate element/s 2 is a cavity 11 or cavities comprising the way for the electrical wiring of the tone arm. These cavities are preferably located in the environment of the major mass of the element/s 2 and they are in connexion with a tube or a cavity 16 in the counterweight rod 4, which are directing the wiring to a position under the suspension point 15.

Further the separate element 2 is extending to above the suspension 1, so that the arm tube or -rod 3 can be attached to the element 2 above the suspension 1. The upper part of the element 2 designated by 2a may be detachable together with the arm tube or -rod 3 that is attached to it. Cavities 13 in the element 2a are thus in connexion with cavities 11 in the element 2b, that is next to it. These cavities are comprising terminals 5 for the electrical contact between the separatable elements. These terminals 5 may also be used to keep the pieces 2a and 2b in the correct position as to each other.

If the extending part of the tone arm 3 carrying the cartridge is a tube, this tube can be pressed flat in the end 14, where the cartridge is to be attached. The resulting lack of assemblies will reduce the possibility of resonances in the arm tube 3, and it will also reduce the inertial moment of the tone arm.

The counterweight tube is carrying a counterweight 8 that can be used for accurate balancing of the arm and a tracking force weight 9 can be used to apply tracking force after the balancing of the arm.

Figure 3:
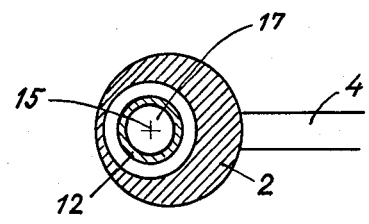
FIG. 3 shows a uni-pivot suspension seen in a horizontal plane.
Figure 5:
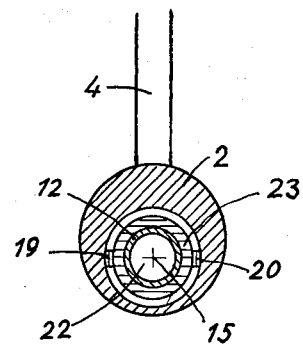
FIG. 5 shows a dual-bearing suspension seen in a horizontal plane.
Figure 4:
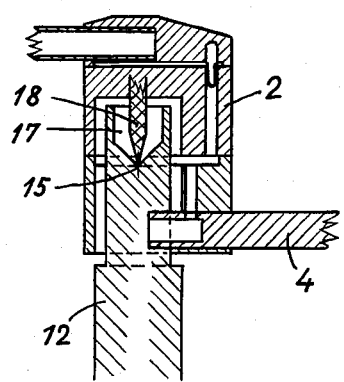
FIG. 4 is a vertical cross section of a uni-pivot suspension.
Figure 6:
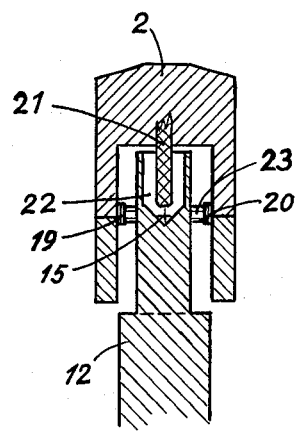
FIG. 6 is a vertical cross section of a dual-bearing suspension.

The suspension 1 of the tone arm is either of the uni-pivot type as shown in FIGS. 3 and 4 with a well 17 for damping fluid in the non moveable part of the arm 12 and positioned in the said cavity in which the suspension 1 is positioned, surrounded by the element/s 2, excentrically with respect to the center of gravity of said separate element/s 2. The pivot 18 is resting in the bottom of the well 17 with the point of the pivot 18 positioned in the suspension point 15. The suspension 1 could also be of the type, where the vertical movement of the arm takes place around two bearings 19 and 20 attached on one side to the said element/s 2, and between said two bearings 19 and 20 a pin 21, which is also attached to the said element/s 2, is positioned and being surrounded by damping fluid in a well 22, that is positioned in the non moveable part 12 of the arm in the said cavity, surrounded by the element/s 2, excentrically with respect to the center of gravity of the said element/s 2. On their other side the above two bearings 19 and 20 are attached to bearings or just one bearing 23 comprising the horizontal movement of the tone arm.

What I claim is:

1. Tone arm of the type in which there is an arm tube or -rod carrying the phono cartridge and a counterweight arm carrying a counterweight which arms are hold by a separate element which moves with said arms and which is attached to the suspension which is again attached to the non moveable part of the tone arm and in which tone arm the said counterweight arm is attached to the lower part of said separate element below the said suspension and facing away from the direction to which the arm tube or -rod is pointing out, characterized in that the suspension around which the moveable part of the arm is moving is placed eccentrically with respect to the center of gravity of the said separate element which is made of solid material and is having the major part of its mass close to and on the side of the suspension that faces away from the side to which the arm tube or -rod is pointing out, and said arm tube or -rod is further extending from the upper part of said separate element above the suspension.

2. Tone arm according to claim 1, characterized in that said separate element consists of one or more pieces which can be made from identical or different kinds of material and in said major part of said separate element/s is a cavity or cavities comprising the way for electrical connection to the arm tube or -rod.

3. Tone arm according to claim 2, characterized in that the upper part of the said separate element—from which the arm tube or -rod is extending—is detachable and is having the connecting terminals leading from this part of the element to the remaining part of the element positioned in cavities in the elements.

4. Tone arm according to claim 2, characterized in that the external surface/s of above said element/s comprise/s shapes of cylinder, cone or parts thereof each having a -or parts of a polygonal-, oval-, elliptical- or circular cross section and the generatrix on the average or parts of it being approximately at right angles to the plane of the record.

5. Tone arm according to claim 4, characterized in that the said element/s either in part of in full—as to the vertical extension of the element/s—is surrounding the suspension when seen in a horizontal plane, so that the suspension is positioned in a cavity in said element/s.

6. Tone arm according to claim 5 comprising a tube for carrying the cartridge, in combination characterized in that the said tube is pressed flat in the end where the cartridge is to be attached.

7. Tone arm according to claim 5, characterized in that the counterweight arm is having a cavity, which is in connexion with cavities in said element/s for the wiring of the tone arm and which is directing the wiring to a position under the suspension thus comprising the way for the wiring to the moveable part of the tone arm, and further the upper part of the said elements—from which the arm tube or -rod is extending—is detachable and is having the connecting terminals leading from this part of the element to the remaining part of the element positioned in the said cavities in the major part of the elements.

8. Tone arm according to claim 7 where the said separate element consists of two or more pieces, characterized in that said pieces are devided from each other by preferably horizontal planes and where the lower piece is holding the arm for balancing weights and where the upper piece is holding the arm tube or -rod carrying the cartridge.

9. Tone arm according to claim 5 where the suspension of the tone arm is of the uni-pivot type with a well for damping fluid in the non moveable part of the arm, characterized in that said well is positioned in said cavity, surrounded by the said element/s, eccentrically with respect to the center of gravity of the said separate element/s and having the pivot resting in the bottom of said well.

10. Tone arm according to claim 5 where the suspension of the tone arm is of the dual-bearing type where the vertical movement of the arm takes place around two bearings, characterized in that the mid-point between said bearings is placed eccentrically with respect to the center of gravity of the said separate element/s and which bearings are attached on one side to the said element/s, and between said two bearings a vertical pin, which is also attached to said elements, is positioned and in combination being surrounded by damping fluid in a well that is positioned in the non moveable part of the tone arm in the said cavity, surrounded by the element/s, and on their other side the above two bearings are attached to bearings or just one bearing comprising the horizontal movement of the tone arm.

11. Tone arm according to claim 5, characterized in that the external surface of said element/s at least in one horizontal plane is having a circular cross section and is having a string for skating compensation attached to it on the surface of the element/s at this plane and in combination with said surface, which is eccentrically positioned as to the suspension, said string is at the other end attached to the point of application for the force of a pulling device which is pulling in such a direction in said plane that the string is reeled around said surface over a range where the horizontal distance from the surface to the suspension is decreasing, as the arm tube or -rod is moved towards the center of the record.

* * * * *